United States Patent
Manken et al.

(10) Patent No.: US 7,654,350 B2
(45) Date of Patent: Feb. 2, 2010

(54) DRIVE AND STEERING UNIT FOR A WHEEL OF A FLOOR CONVEYOR

(75) Inventors: Frank Manken, Henstedt-Ulzburg (DE); Ulf Schipper, Norderstedt (DE); Martin Von Werder, Ammersbek (DE); Hans Rudolf Wrede, Norderstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 546 days.

(21) Appl. No.: 11/585,583

(22) Filed: Oct. 24, 2006

(65) Prior Publication Data
US 2007/0119649 A1    May 31, 2007

(30) Foreign Application Priority Data
Nov. 30, 2005   (DE) .................. 10 2005 058 400

(51) Int. Cl.
*B60K 1/00* (2006.01)
(52) U.S. Cl. .............. 180/65.51; 180/65.6; 180/252; 180/253
(58) Field of Classification Search .......... 180/65.51, 180/65.6, 400, 443, 446, 408, 410, 411, 412, 180/234, 252, 253, 255, 200, 202, 204, 21
See application file for complete search history.

(56) References Cited

U.S. PATENT DOCUMENTS

| | | | | |
|---|---|---|---|---|
| 4,513,839 A | * | 4/1985 | Nieminski et al. .......... 180/253 |
| 5,128,598 A | * | 7/1992 | Avitan .................. 318/587 |
| 6,145,611 A | * | 11/2000 | Haddad, Sr. ............. 180/12 |
| 6,175,171 B1 | | 1/2001 | Rupp et al. |
| 6,349,781 B1 | * | 2/2002 | Kruse .................. 180/7.2 |
| 6,491,127 B1 | * | 12/2002 | Holmberg et al. .......... 180/252 |
| 6,548,981 B1 | | 4/2003 | Ishii et al. |
| 6,688,416 B2 | * | 2/2004 | Higaki et al. ............ 180/253 |
| 6,948,576 B2 | * | 9/2005 | Angeles ................ 180/23 |
| 6,991,059 B2 | * | 1/2006 | Stubbe ................. 180/253 |

FOREIGN PATENT DOCUMENTS

| | | |
|---|---|---|
| DE | 199 49 351 | 7/2001 |
| DE | 102 27 725 | 1/2004 |
| DE | 10 2004 006 722 A1 | 1/2005 |

\* cited by examiner

*Primary Examiner*—S. Joseph Morano
*Assistant Examiner*—Katy Meyer
(74) *Attorney, Agent, or Firm*—Vidas, Arrett & Steinkraus, P.A.

(57) ABSTRACT

Drive and steering unit for a wheel of a floor conveyor, in which a driving motor and a steering motor are disposed coaxially one below the other and are each one coupled via a drive gear or a steering gear, respectively, with a shaft of the wheel or the bearing equipment of the wheel, respectively, wherein one shaft extends as a hollow shaft and the other shaft extends through the hollow shaft, and an electronic control for the driving motor and the steering motor, which is connected with desired value transmitters for the rotational speed and the steering angle, characterised in that the electronic control has at least one circuit board which is coaxially arranged between the driving motor and the steering motor and/or the steering motor and the steering gear.

13 Claims, 5 Drawing Sheets

DRIVE AND STEERING UNIT FOR A WHEEL OF A FLOOR CONVEYOR

CROSS-REFERENCE TO RELATED APPLICATIONS

Not applicable.

STATEMENT REGARDING FEDERALLY SPONSORED RESEARCH

Not applicable.

BACKGROUND OF THE INVENTION

A drive and steering unit of the type mentioned at the start has become known from DE 199 49351 A1, the entire contents of which is incorporated herein by reference in its entirety. A turntable for the driven and steered wheel has a fork which mounts a horizontal shaft for the wheel in a bearing. Driving motor and steering motor are coaxially arranged on top of each other. A first gear is arranged between the driving motor and the steering motor, which acts upon a bevel gear via a shaft to drive the wheel shaft. The shaft extends through a hollow shaft of the steering motor. The hollow shaft acts upon the turntable via a steering gear, in order to turn it about the desired steering angle, in accordance with a signal of a steering angle transmitter.

Shifting the turntable via a laterally arranged steering motor with an axis parallel to the driving motor is also usual. The transmission of force takes place via a planetary gear which is integrated into the motor casing, a chain or a direct toothing. As a rule, sensors for measuring temperature and also rotation speed are located in the driving motor, which are connected with the external control via a sensor plug. The motor phases are connected to the control via a clamping board.

From De 102 27 725 A1, the entire contents of which is incorporated herein by reference in its entirety, it is known to fix the electronic control for a driving motor and/or steering motor radially on the motor casing.

The present invention is based on the objective to provide a drive and steering unit for a wheel of a floor conveyor that can be made in a packaged manner which makes preassembly possible and which can be installed into conventional constructions.

BRIEF SUMMARY OF THE INVENTION

In the unit according to the invention, the electronic control is accommodated on at least one circuit board, which is coaxially arranged between the driving motor and the steering motor and/or the steering motor and the steering gear.

A very small space requirement for the drive and steering unit due to the high density of integration of the individual component parts is advantageous in the invention. In addition, preassembly in individual assemblies and the unit can be realised in a simple manner through this.

According to one embodiment of the invention, it is provided that the circuit board has a hole approximately in its centre, through which one or both of the shafts are guided through. In this way, the whole of the cross section area of the motor casing can be utilised for the circuit board and the corresponding fixing of electronic components.

According to one embodiment of the invention, the motor casing is preferably pipe-shaped and the circuit board is preferably realised as a circular perforated disc.

In the drive and steering unit according to the present invention, the motor casing can serve as a heat sink for the components which are fixed on the circuit board. According to one embodiment of the invention, a fan propeller for cooling the electronic components which are arranged on the circuit board can sit on one or both shafts, in addition or alternatively to the ventilation. It is not necessary to say that a force-driven fan can also be used for cooling purposes.

According to a further embodiment of the present invention, the common casing for the driving and the steering motor has a lateral plug-in connection for the power supply of the motors, as well as inputs for the desired rotational speed value signal for the driving motor and the desired angle signal for the steering motor. Preferably, the plug-in connection is fixed immediately on the circuit board.

It has been already mentioned at the start that as a rule, driving and steering motor have sensors for detecting the real rotational speed and the real steering angle, respectively. According to a further embodiment of the present invention, a sensor for detection of the motor temperature and/or a sensor for the rotational speed of the driving motor and/or a sensor for the rotational position of the rotor of the steering motor is arranged on the circuit board. According to a further embodiment of the present invention, the sensors for rotational speed or angle, respectively, can co-operate immediately with the assigned shaft of the corresponding motor.

For security reasons, redundantly connected microprocessors are preferably provided for the electronic control of both motors.

It is conceivable to accommodate the whole of the electronic control for both motors on one circuit board. As an alternative, according to one embodiment of the present invention two or several coaxial circuit boards are provided, from which the one contains the control for the driving motor and the other one that for the steering motor. However, the processors of the two circuit boards may be realised to be redundant, i.e. to be programmed for both controls. For this reason, the signals of the sensors are connected to both processors. This is because of the redundancy on the one hand, and because of a possible dependence of the functions of the two motors on the other hand. For instance, the steering angle speed of the steering motor is made to depend from the driving speed. Also, the maximum steering angle may be limited by a predetermined driving speed. The other way round, the driving speed may be limited by the steering angle. The gear ratio of the steering angle between steering angle transmitter and steered wheel can also be changed depending on the driving speed.

When two circuit boards are used, the same can be arranged immediately one on top of the other, wherein they are preferably arranged between driving motor and steering motor. However, it is also conceivable to arrange one circuit board between driving motor and steering motor and a second circuit board between steering motor and steering gear at a time. The latter is a so-called eccentric gear or cyclo-gear, for instance.

It is also known to equip driving motors for drive and steering units for a wheel of a floor conveyor with a brake. According to one embodiment of the present invention, a brake unit is located at the upper end of the driving motor, wherein the brake signals can also be transmitted via the plug-in connection.

BRIEF DESCRIPTION OF THE SEVERAL VIEW OF THE DRAWINGS

The present invent will be explained in more detail by means of realisation examples in the following.

DETAILED DESCRIPTION OF THE INVENTION

Figures 1, 2:
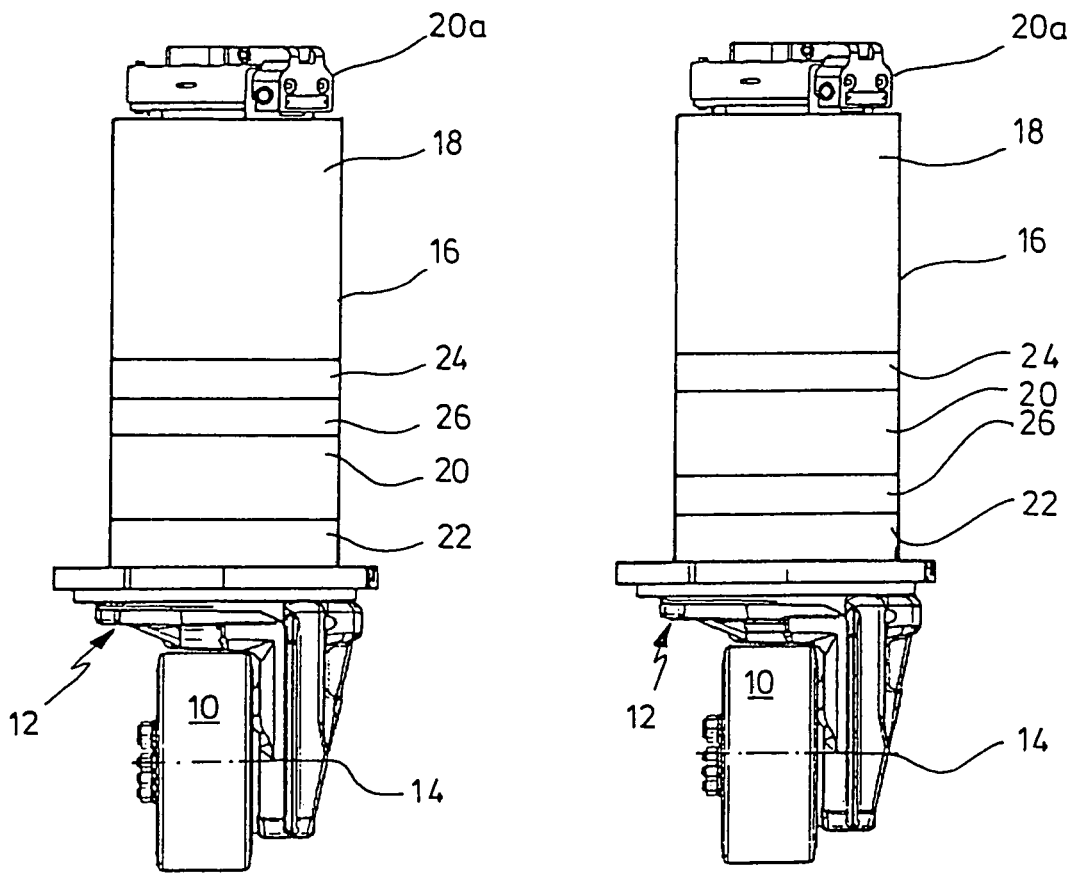
FIG. 1 shows schematically the side view of a first embodiment of a drive and steering unit according to the present invention.
FIG. 2 shows another embodiment of a drive and steering unit according to the present invention, in the same view as in FIG. 1.

While this invention may be embodied in many different forms, there are described in detail herein a specific preferred embodiment of the invention. This description is an exemplification of the principles of the invention and is not intended to limit the invention to the particular embodiment illustrated In FIGS. 1 and 2, a driven and steered wheel 10 of a not shown floor conveyor can be recognised, which is supported in a bearing in a turntable 12. On the turntable 12, a gear 14 is held, through which the not shown shaft of the wheel 10 is driven (bevel wheel gear). The turntable 12 is rotatably mounted around a vertical axis in the frame of the not shown floor conveyor. On the turntable 12 sits a pipe-shaped casing 16, in which a driving motor 18 and steering motor 20 are accommodated. The driving motor 18 has a shaft (not shown), which extends to the gear 14 through the steering motor 20. The steering motor 20 has a hollow shaft, which is coupled with the turntable 12 and through which the shaft of the driving motor extends. Such a coaxial arrangement of the motors 18, 20 and the not shown shafts is disclosed in DE 199 49 351 A1, for instance. An electromagnetic brake 20a is arranged on the casing 16 above the driving motor 18. The steering motor 20 acts upon the turntable 12 with its hollow shaft via an eccentric gear 22. In FIG. 1, two coaxial circuit boards 24, 26 are arranged in the casing 16 between the driving motor and the steering motor 20. In the embodiment according to FIG. 2, only the circuit board 24 is arranged between driving motor 18 and steering motor 20, whereas the circuit board 26 is arranged between the steering motor and the steering gear 22.

Figure 3:
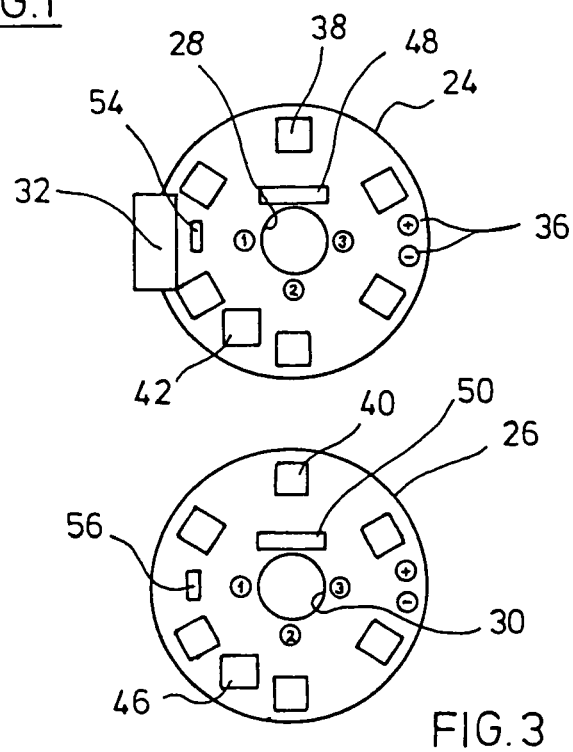
FIG. 3 shows two circuit boards for the drive and steering unit according to FIGS. 1 and 2 in a top view.

In FIG. 3, the circuit boards 24, 26 are represented in a schematic manner. The support of the circuit board 24, 26 is circular and matched to the inside diameter of the casing 16. In the centre, a circular hole 28 or 30, respectively, is provided, through which the shaft of the driving motor 18 or both shafts of driving motor 18 and steering motor 20 extend, respectively. The circuit board 24 has a plug-in connection 32, which is accessible via the casing 16 and a corresponding opening (not shown). The power supply of the motors 18 and 20 takes place via the plug-in connection 32. Further, desired value transmitters for driving and steering as well as a brake signal transmitter can be connected to the plug-in connection 32 via a plug. On the terminals 36, the supply with battery power takes place, which has to be transformed into three-phase alternating current for the three-phase a.c. motors. For this purpose, each circuit board 24, 26 has six power transistors 38 or 40, respectively, which are located uniformly distributed on the circuit board 24, 26. At the points 1, 2 and 3 of the circuit boards 24 and 26, respectively, the lines for the motors 18 and 20 are connected, respectively. On each circuit board 24, 26 there is also a microprocessor 42 or 46, respectively, and a sensor 48 for measuring the rotational speed of the driving motor 18 and a sensor 50 for measuring the rotational speed of the steering motor 20. An additional sensor 54 measures the temperature of the driving motor 18 and a sensor 56 on the circuit board 26 measures the temperature of the steering motor 20. The microprocessors 42 and 46 are realised in a redundant manner, i.e. they serve for controlling both motors 18, 20 in the same way, so that even the signals of the sensors 48, 50, 54 and 56 can be applied to both processors. The sensors 48, 50 can be realised such that they co-operate with the assigned shaft, through being realised as hall sensors, for instance.

Of course, it is also conceivable to arrange a part of the electronic control of one or both motors at the outside on the motor casing, on cooling ribs of the casing, for instance.

Figure 4:
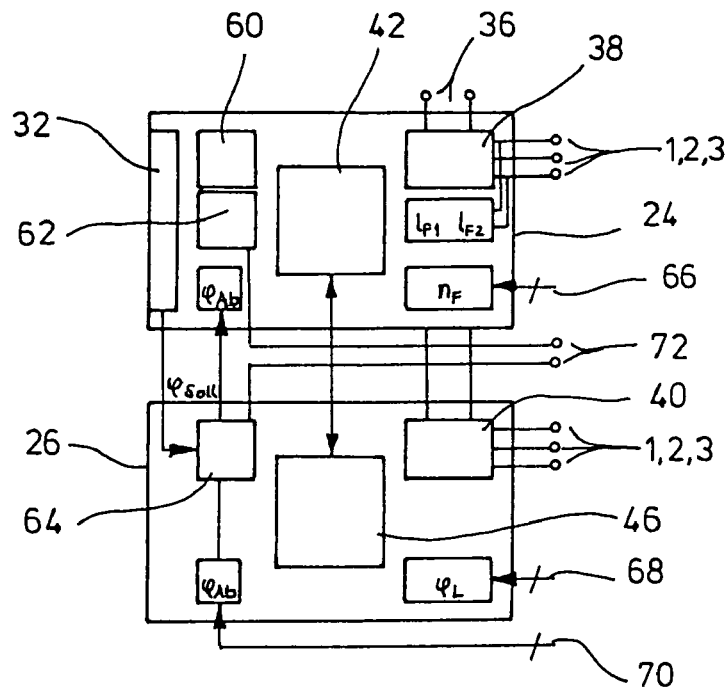
FIG. 4 shows a possible distribution of functions on the circuit boards according to FIG. 3.

In FIG. 4, the distribution of functions on the circuit boards 24, 26 is indicated as an example. A CAN bus is indicated at 60 and at 62 an in-out stage, a further in-out stage being provided at 64. The supply of the signals from the sensors which are not shown in FIG. 4 is shown at 66 for the rotational speed sensor, at 68 for the rotational angle of the rotor of the steering motor 20 and at 70 for the angle which the turntable 12 occupies with respect to the frame. The rotational speed is indicated as $n_F$ and the first rotational angle as $\phi_L$ and the second rotational as $\phi_{Ab}$. The desired steering angle $\phi_{Soll}$ is put in via the plug-in connection 32, as has been described. As has been further pointed out already, even the brake signal for the brake 20a reaches the same via the plug-in connection 32. The output of the circuit boards 24, 26 for the brake 20a is indicated with 72.

Figure 5:
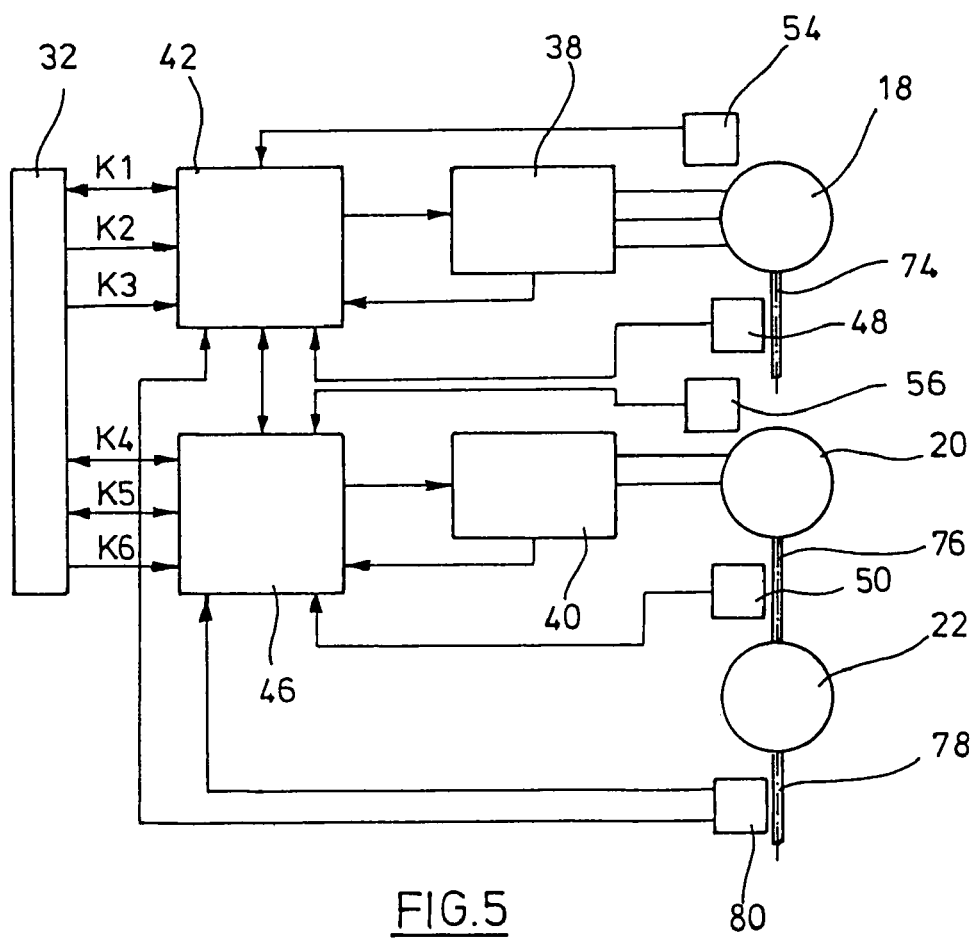
FIG. 5 shows a functional block diagram of the circuit boards according to FIGS. 3 and 4.

In the functional block diagram according to FIG. 5 the motors 18, 20 as well as the steering gear 22 are represented again. In addition, the shaft 74 of the driving motor 18 and the hollow shaft 76 of the steering motor 20 can be recognised, as well as the output shaft 78 of the steering gear 22. On recognises that the sensors 48 and 50, respectively, are each assigned to one motor shaft at a time. An additional sensor is assigned to the output shaft 78 and serves to detect the real steering angle, i.e. the angle between the driving wheel 10 and the frame. This sensor is indicated with 80.

The transmission channels K1 to K6 mean:

K1 CAN bus
K2 desired value driving speed
K3 desired value steering angle
K4 CAN bus
K5 other inputs and outputs
K6 steering angle (redundant to K3)

Figure 6:
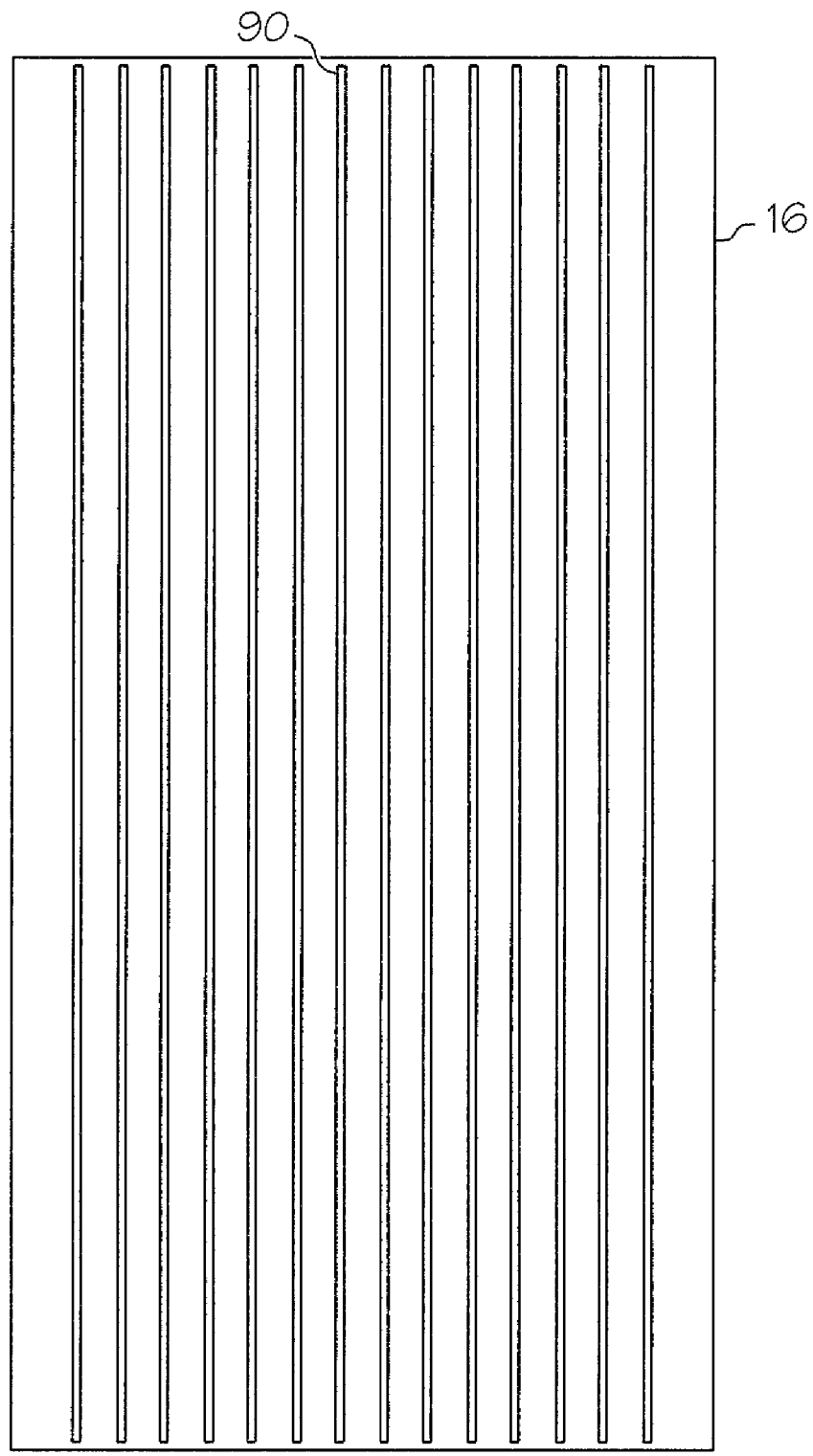
FIG. 6 shows the cooling ribs of the casing.

FIG. 6 shows the cooling ribs 90, on the casing 16, provided for passive cooling.

Figure 7:
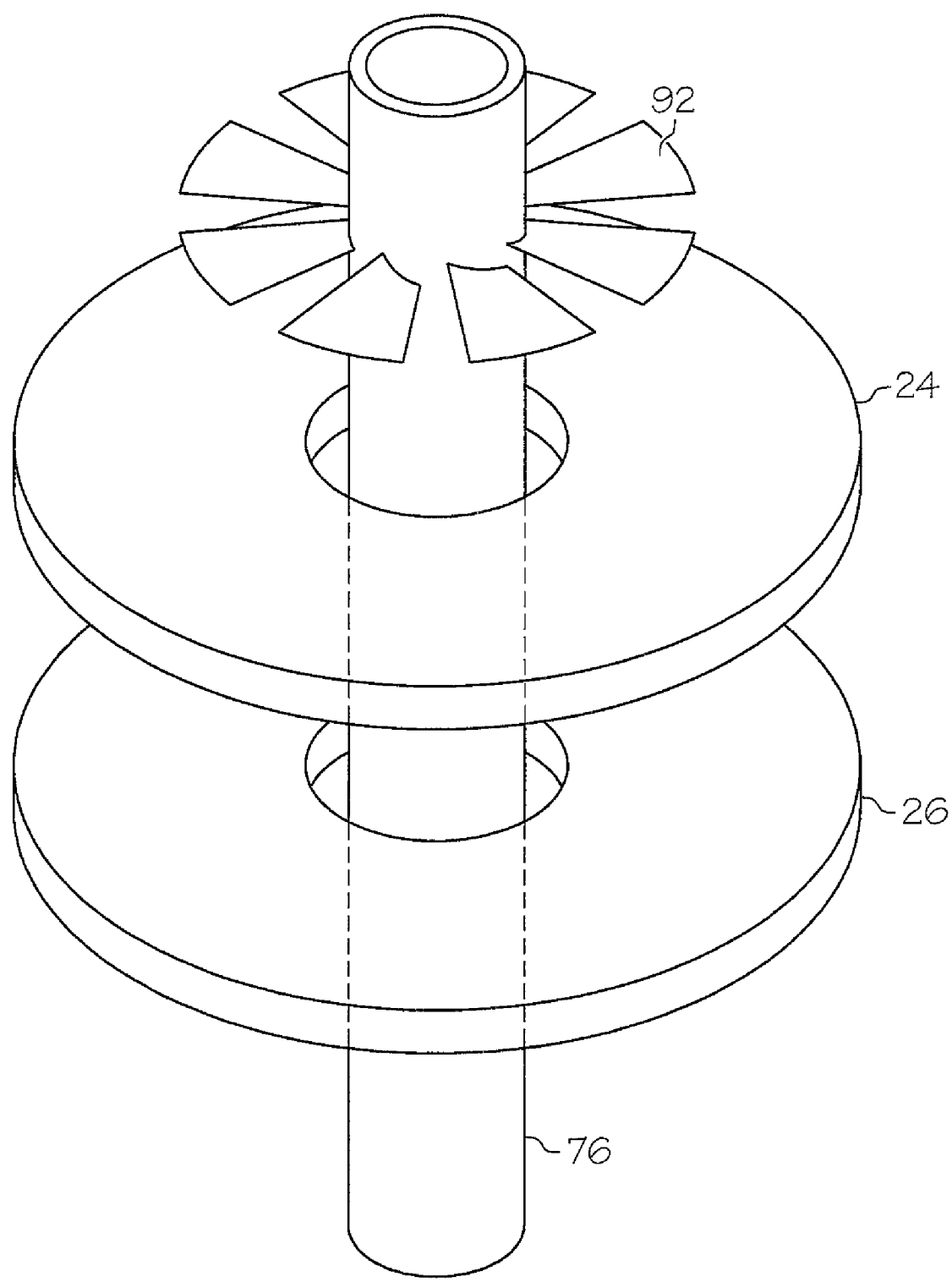
FIG. 7 shows the fan propeller.

FIG. 7 shows the propeller fan 92, for cooling the electronic components which are arranged on the circuit board, and which can sit on one or both shafts.

Figure 8:
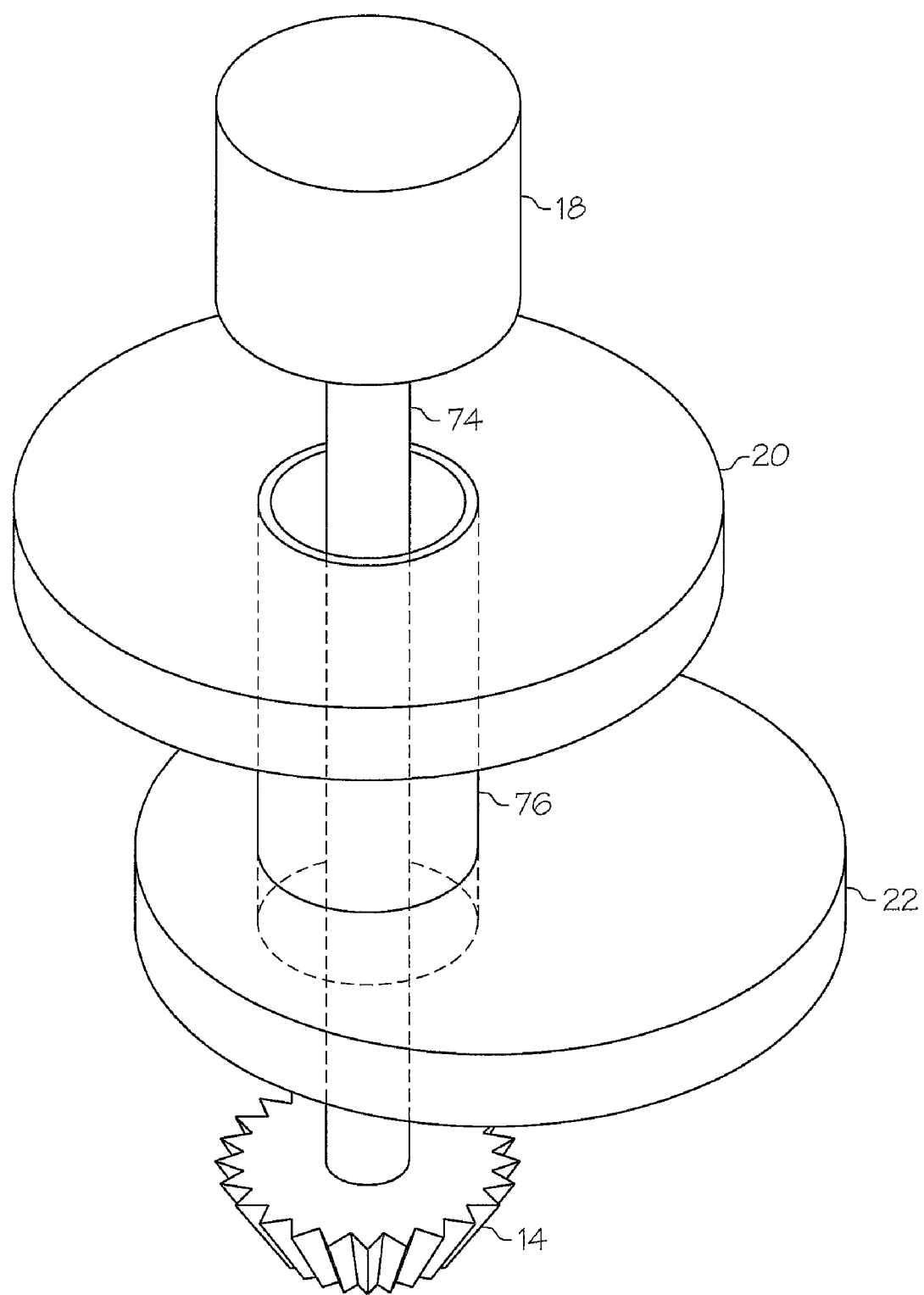
FIG. 8 shows the arrangement of the shafts of the driving motor and the steering motor.

FIG. 8 shows, the shaft 74 of the driving motor 18 extending through the hollow shaft 76 of the steering motor 20.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A drive and steering unit for a wheel of a floor conveyor, in which a driving motor having a first shaft and a steering motor having a second shaft are disposed coaxially, one below the other and are each one coupled via a drive gear or a steering gear, respectively, with a shaft of a wheel or the bearing equipment of the wheel, respectively, wherein one of the first shaft and the second shaft is hollow and the other of the first shaft and the second shaft extends through said hollow shaft, and an electronic control for the driving motor and the steering motor, which is connected with desired value transmitters for the rotational speed and the steering angle, characterized in that the electronic control has at least one circuit board which is coaxially arranged between the driving motor and/or the steering motor and the steering gear.

2. The drive and steering unit according to claim 1, characterised in that the circuit board has a hole approximately in its centre, through which one of the shafts or both is or are guided through, respectively.

3. The drive and steering unit according to claim 1, characterised in that one pipe-shaped casing for both motors is provided and the circuit board is realised as a circular perforated disc.

4. The drive and steering unit according to claim 1, characterised in that a fan propeller for cooling electronic components which are fixed on the circuit board sits on one of the two shafts.

5. The drive and steering unit according to claim 1, characterised in that the casing is provided with cooling ribs for a passive cooling.

6. The drive and steering unit according to claim 1, characterised in that a common casing for the driving and the steering motor has a lateral plug-in connection for the power supply of the motors as well as inputs for the desired rotational speed value signal for the driving motor and the desired steering signal for the steering motor.

7. The drive and steering unit according to claim 1, characterised in that a sensor for the detection of the motor temperature and/or a sensor for the rotational speed of the driving motor and/or a sensor for the rotational position of the rotor of the steering motor is arranged on the circuit board.

8. The drive and steering unit according to claim 1, characterised in that two redundantly connected microprocessors are provided for the electronic control.

9. The drive and steering unit according to claim 1, characterised in that two coaxial circuit boards are provided, one of which contains the control for the driving motor and the other one that for the steering motor.

10. The drive and steering unit according to claim 9, characterised in that the first circuit board is arranged between the driving motor and the steering motor and the second circuit board is arranged between the steering motor and the steering gear.

11. The drive and steering unit according to claim 9, characterised in that both circuit boards are arranged immediately on top of each other as a packet between the driving motor and the steering motor.

12. The drive and steering unit according to claim 5, characterised in that a brake is arranged on the upper end of the driving motor, and the plug-in connection has also an input for the brake signal.

13. The drive and steering unit according to claim 7, characterised in that the sensors co-operate with a shaft of the driving motor, a shaft of the steering motor and a shaft of the steering gear, respectively.

* * * * *